United States Patent [19]

Nelson

[11] 4,390,680

[45] Jun. 28, 1983

[54] PHENOLIC HYDROXYL-CONTAINING COMPOSITIONS AND EPOXY RESINS PREPARED THEREFROM

[75] Inventor: Donald L. Nelson, Lake Jackson, Tex.

[73] Assignee: The Dow Chemical Company, Midland, Mich.

[21] Appl. No.: 362,801

[22] Filed: Mar. 29, 1982

[51] Int. Cl.$^3$ ............... C08G 59/00; C08G 65/08; C08G 65/14

[52] U.S. Cl. .................... 528/97; 528/101; 549/517

[58] Field of Search .............. 528/97, 101; 549/512, 549/517

[56] References Cited

U.S. PATENT DOCUMENTS 2,385,787 10/1945 Bruson .......................... 260/612
3,404,102 10/1968 Starcher et al. ................ 260/2
3,419,624 12/1968 Cotter et al. ................... 260/619
3,461,097 8/1969 Cotter et al. ................... 260/47
3,536,734 10/1970 Vegter et al. .................. 260/348.6
3,582,516 6/1971 LeBlanc ......................... 260/33.6
3,637,430 1/1972 Dahms et al. .................. 117/143 A
3,944,523 3/1976 Gobran .......................... 260/62
4,313,886 2/1982 Massingill ...................... 549/517

FOREIGN PATENT DOCUMENTS 2028314A 3/1980 United Kingdom .

Primary Examiner—Lucille M. Phynes
Attorney, Agent, or Firm—J. G. Carter

[57] ABSTRACT

Epoxy resins are prepared by dehydrohalogenating the reaction product of an epoxy alkyl halide such as epichlorohydrin with the reaction product of an aromatic hydroxyl-containing compound such as phenol with an unsaturated hydrocarbon such as piperylene or isoprene or mixtures of dicyclopentadiene with other dimers or oligomers derived from $C_3$–$C_6$ unsaturated hydrocarbons.

21 Claims, No Drawings

PHENOLIC HYDROXYL-CONTAINING COMPOSITIONS AND EPOXY RESINS PREPARED THEREFROM

BACKGROUND OF THE INVENTION

The present invention concerns epoxy resins and method for their preparation.

Epoxy resins have heretofore been prepared from condensates of aromatic hydroxyl-containing compounds and aldehydes and ketones. Commercially available high performance epoxy resins such as the phenol-formaldehyde resins possess excellent properties but in some instances may have less than desired moisture or chemical resistance properties, electrical properties or low elongation values.

In addition to overcoming one or more of the aforementioned deficiencies, the epoxy resins of the present invention, in some instances, have improved mold shrink properties.

SUMMARY OF THE INVENTION

One aspect of the present invention concerns epoxy resins produced from the dehydrohalogenation of the reaction product of
- (A) an epoxy alkyl halide; with
- (B) the acid catalyzed product resulting from reacting
  - (1) at least one aromatic hydroxyl-containing compound having from one to two aromatic rings and at least one ortho or para position with respect to a hydroxyl group available for ring alkylation; with
  - (2) at least one unsaturated hydrocarbon selected from
    - (a) monounsaturated or diunsaturated hydrocarbons having from 4 to 6 carbon atoms or mixture thereof;
    - (b) unsaturated hydrocarbons containing an average of from 6 to about 55 carbon atoms per molecule and containing not more than 94 weight percent dicyclopentadiene;
    - (c) oligomers and/or cooligomers of hydrocarbon dienes, which dienes have from 4 to about 18 carbon atoms and which dienes contain at least 6% by weight of dienes other than dicyclopentadiene; and
    - (d) mixtures thereof; and wherein the components (B-1) and (B-2) are employed in quantities which provide a mole ratio of (B-1) to (B-2) of from about 1.8:1 to about 30:1, preferably from about 1.8:1 to about 20:1; and components (A) and (B) are employed in quantities which provide an epoxy group to phenolic hydroxyl group ratio of from about 1.5:1 to about 20:1, preferably from about 3:1 to about 5:1.

Another aspect of the present invention pertains to compositions having more than one phenolic hydroxyl group and more than one aromatic ring per molecule, which is substantially free of ether groups and which composition results from an acid catalyzed reaction of
- (A) at least one aromatic compound containing at least one aromatic hydroxyl-group and from one to two aromatic rings and at least one ortho or para position with respect to a hydroxyl group available for ring alkylation; with
- (B) at least one unsaturated hydrocarbon selected from
  - (1) monounsaturated or diunsaturated hydrocarbons having from 4 to 6 carbon atoms or mixture thereof;
  - (2) unsaturated hydrocarbons containing an average of from 6 to about 55 carbon atoms per molecule and containing not more than 94 weight percent dicyclopentadiene;
  - (3) oligomers and/or cooligomers of hydrocarbon dienes, which dienes have from 4 to about 18 carbon atoms and which dienes contain at least 6% by weight of dienes other than dicyclopentadiene; and
  - (4) mixtures thereof; and wherein components (A) and (B) are employed in quantities which provide a mole ratio of component (A) to component (B) of from about 1.8:1 to about 30:1, preferably from about 1.8:1 to about 20:1 and wherein said acid catalyst is employed in a quantity of from about 0.01% to about 5%, preferably from about 0.3% to about 1% by weight based upon the weight of component (A).

Another aspect of the present invention is the products resulting from subjecting the aforementioned epoxy resins to curing conditions in the presence of a curing quantity of a suitable curing agent.

DETAILED DESCRIPTION OF THE INVENTION

Suitable aromatic hydroxyl-containing compounds which can be employed herein include any such compounds which contain one or two aromatic rings, at least one phenolic hydroxyl group and at least one ortho or para ring position with respect to a hydroxyl group available for alkylation.

Particularly suitable aromatic hydroxyl-containing compounds which can be employed herein include, for example, phenol, chlorophenol, bromophenol, methylphenol, hydroquinone, catechol, resorcinol, guaiacol, pyrogallol, phloroglucinol, isopropylphenol, ethylphenol, propylphenol, t-butylphenol, isobutylphenol, octylphenol, nonylphenol, cumylphenol, p-phenylphenol, o-phenylphenol, m-phenylphenol, bisphenol A, dihydroxydiphenyl sulfone, mixtures thereof and the like.

Suitable unsaturated hydrocarbons which, either in a crude or purified state, can be employed herein include, for example, butadiene, isoprene, piperylene, cyclopentadiene, cyclopentene, 2-methyl butene-2, cyclohexene, cyclohexadiene, methyl cyclopentadiene, dicyclopentadiene, limonene, dipentene, linear and cyclic dimers of piperylene, methyl dicyclopentadiene, dimethyl dicyclopentadiene, norbornene, norbornadiene, ethylidene norbornene, mixtures thereof and the like. Also suitable unsaturated hydrocarbons include the other dimers, codimers, oligomers and cooligomers of the aforementioned unsaturated hydrocarbons. Particularly suitable unsaturated hydrocarbons which can be employed herein include, for example, a dicyclopentadiene concentrate containing from about 70 to about 94 percent by weight of dicyclopentadiene; from about 6 to about 30 percent by weight of $C_9$–$C_{12}$ dimers or codimers of $C_4$–$C_6$ dienes such as, for example, cyclopentadiene-isoprene, cyclopentadienepiperylene, cyclopentadiene-methyl cyclopentadiene, and/or dimers of isoprene, piperylene, methyl cyclopentadiene and the like; from about zero to about 7 percent by weight of $C_{14}$–$C_{18}$ trimers of $C_4$–$C_6$ dienes and from about zero to about 10 percent by weight of aliphatic diolefins such as, for example, piperylene, isoprene, 1,5-hexadiene and cyclic olefins such as cyclopentadiene, methyl cyclopentadiene, cyclopentene and the like. Methods of preparation for these dicyclopentadiene concentrates and more detailed descriptions thereof can be found collectively in U.S. Pat. No. 3,557,239 issued to Gebhart et al. and U.S. Pat. No. 4,167,542 issued to Nelson, both of which are incorporated herein by reference.

Also, particularly suitable unsaturated hydrocarbons which can be employed herein include a crude dicyclopentadiene stream containing from about 20 to about 70 percent by weight dicyclopentadiene, from about 1 to about 10 percent codimers and dimers of $C_4$-$C_6$ hydrocarbons (described above), from about zero to about 10 percent oligomers of $C_4$-$C_6$ dienes and the balance to provide 100 percent, $C_4$-$C_6$ alkanes, alkenes and dienes.

Also, particularly suitable unsaturated hydrocarbons which can be employed herein include a crude piperylene or isoprene stream containing from about 30 to about 70 percent by weight piperylene or isoprene, about zero to about ten percent by weight $C_9$-$C_{12}$ dimers and codimers of $C_4$-$C_6$ dienes, and the balance to provide 100% $C_4$-$C_6$ alkanes, alkenes and dienes.

Also, particularly suitable are hydrocarbon oligomers prepared by polymerization of the reactive components in the above hydrocarbon streams e.g., dicyclopentadiene concentrate, crude dicyclopentadiene, crude piperylene or isoprene, individually or in combination with one another on in combination with high purity diene streams.

Suitable acid catalysts which can be employed herein include, for example, Lewis Acids, alkyl, aryl and aralkyl sulfonic acids and disulfonic acids of diphenyloxide and alkylated diphenyloxide, sulfuric acid, mixtures thereof and the like.

Particularly suitable are such Lewis Acids as $BF_3$ gas, organic complexes of boron trifluoride such as those complexes formed with phenol, cresol, ethanol, acetic acid and the like. Also suitable Lewis acids include aluminum chloride, zinc chloride, stannic chloride, and the like.

Also suitable catalysts include, for example, activated clays, silica, silica-alumina complexes, and the like.

Suitable epoxy alkyl halides which can be employed herein include those represented by the formula

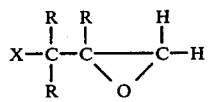

wherein each R is independently hydrogen or an alkyl group having from 1 to about 6 carbon atoms and X is a halogen.

Particularly suitable epoxy alkyl halides include, for example, epichlorohydrin, epibromohydrin, epiiodohydrin, methylepichlorohydrin, methylepibromohydrin, methylepiiodohydrin, mixtures thereof and the like.

The epoxy resins of the present invention can be cured by themselves or in mixtures with other epoxy resins with well known curing agents or with the reaction products of the phenols and unsaturated hydrocarbons described herein or mixtures of them with the well known curing agents.

The well known epoxy resins and curing agents which can be employed herein are more fully described by Lee and Neville in HANDBOOK OF EPOXY RESINS, McGraw-Hill, 1967 which is incorporated herein by reference.

Particularly suitable curing agents include, for example, primary, secondary and tertiary amines, polycarboxylic acids and anhydrides thereof, polyhydroxy aromatic compounds, combinations thereof and the like.

In preparing the compositions of the present invention containing an average of more than one phenolic hydroxyl group and more than one aromatic ring per molecule, the reaction between the phenolic hydroxyl-containing compounds and the unsaturated hydrocarbons can be conducted at temperatures of from about 33° C. to about 270° C., preferably from about 33° C. to about 210° C.

The following examples are illustrative of the present invention, but are not to be construed as to limiting the scope thereof in any manner.

EXAMPLE 1—(OLIGOMER PREP)

To a Parr reactor, equipped with a stirrer, heater, temperature and pressure indicators was charged 1600 gms of dicyclopentadiene (DCPD) concentrate. (DCPD concentrate contains about 80%–85% DCPD, 13%–19% codimers of cyclopentadiene with other $C_4$ and $C_6$ dienes and 1.0%–5% lights ($C_4$-$C_6$ mono-olefins and di-olefins). The reactor was pressured to 200 psig with nitrogen gas and heated to 185° C. for about 2 hours and 20 minutes (8400 s). Maximum observed gauge pressure was 272 psi (1875 kPa). The heat was turned off, the reactor vented and the contents, a white slurry at room temperature, were removed. The product was believed to be a mixture of $C_4$-$C_6$ dimers, trimers, tetramers and pentamers having an average molecular weight of about 198.

EXAMPLE 2—(OLIGOMER PREP)

To a Parr reactor equipped as in Example 1 was added 1600 gms of a similar concentrate of dycyclopentadiene. The reactor was pressurized to 200 psig (1379 kPa) and heated to 200° C., and held at that temperature for about 2 hours (7200 s). The resultant product was a waxy solid at room temperature and believed to be a mixture consisting primarily of $C_4$-$C_6$ trimers, tetramers, pentamers and hexamers having an average molecular weight of 264.

EXAMPLE 3—(PHENOLIC RESIN PREP)

To a reactor, equipped with a stirrer, condenser, thermowell and heater, were added 846.9 gms (9.0 moles) of phenol, 50 gms of water and 5.0 gms (0.6% based on phenol) of concentrated sulfuric acid. The contents of the reactor were heated to 124° C. 1.5 moles of hydrocarbon oligomer, prepared in a manner similar to Example 1, but with a molecular weight of about 214, was added to the reactor over a 1-hour (3600 s) period. 50 gms of toluene was used to wash oligomer particles from the dropping funnel. After 1 hour 10 minutes (4200 s), the reactor temperature was set at 190° C. and the vacuum distilling assembly put in place. Distillation was conducted over a 3-hour (10800 s) period, finishing at 210° C. and 1 mm of mercury. The total distillate was 663.1 gms, providing a recovered product of 611.4 gms. Table 1 describes further results of this synthesis.

EXAMPLE 4—(PHENOLIC RESIN PREP)

To a reactor equipped as in Example 3 were added 2258 gms (24 moles) of phenol and 30.8 gms of $BF_3$ etherate in 40 gms of carbon tetrachloride. The reactor was heated to 73° C. Over a two hour and 51 minute (10260 s) period, with temperatures between 73° C. and 83° C., was added 824 gms (4 moles) of an oligomer bearing the commercial designation of RI-300. (RI-300, which is available from CXI Incorporated, is an oligomer believed to have been prepared from mainly piperylene with lesser amounts of cyclopentadiene, isoprene, butadiene and methyl cyclopentadiene. The estimated mole weight is 206.) After the oligomer addition was complete, the temperature was increased to 150° C. over 3 hours and 20 minutes (12000 s). A reaction time of 6 hours and 25 minutes (23100 s) was allowed at 150° C., at which time distillation was started. The total distillate was 1830.4 gms and the yield was 1322.4 gms. See Table 1 for further results of this synthesis.

EXAMPLE 5—(PHENOLIC RESIN PREP)

To a reactor equipped as in Example 3 was added 1693.8 gms (18 moles) of molten phenol and 10.3 gms $BF_3$ etherate in 10 gms of carbon tetrachloride. The mass was heated to 70° C. at which point slow addition of 599.4 gms of dicyclopentadiene concentrate was begun. (The DCPD concentrate contained about 83% DCPD and 0.9% lights—the remainder being primarily mixed $C_4$–$C_6$ dienes.). After about ½ of the dicyclopentadiene concentrate had been added, another 10.3 gms of $BF_3$ etherate in 10 gms of carbon tetrachloride was added to the reactor. The total hydrocarbon addition time was two hours (7200 s) within a temperature range of 70° C. to 80° C. The reaction mass was heated to 155° C. over a 5 hour and 39 minute (20340 s) time period. The reaction was held to 155° C. for 7 hours and 41 minutes (27660 s) at which time distillation was begun. The reaction was completed at 165° C. and 1 mm of mercury. The total distillate was 995 gms providing a yield of 1338.8 gms. See Table 1 for additional results of this synthesis.

EXAMPLE 6—(PHENOLIC RESIN PREP)

To a reactor equipped as in Example 3 were added 1974 gms (21 moles) of molten phenol and 23.2 gms of $BF_3$ etherate in 60 gms of carbon tetrachloride. At a temperature of 65° C. the addition of 924 gms (3.5 moles) of a hydrocarbon oligomer prepared in a manner similar to Example 2 was begun. 30 gms of toluene and 30 gms of carbon tetrachloride were added to the oligomer as a washing solvent. The oligomer addition time was 5 hours and 8 minutes (18480 s) within a temperature range of 65° C. to 84° C. When addition was complete, the reaction was heated to 160° C. over a 6 hour and 41 minute 24060 s) period. After about 5 hours (18000 s) at that temperature vacuum distillation was started. The reaction was finished at 200° C. and 1 mm of mercury. Total distillate recovery was 1284 gms to provide a total yield of 1757.2 gms. See Table 1 for additional results of this synthesis.

EXAMPLE 7—(PHENOLIC RESIN PREP)

To a reactor equipped as in Example 3 were charged 1599.7 gms (17 moles) of phenol and 9.0 gms of $BF_3$ etherate, 0.4% by weight based on total expected charge. The $BF_3$ etherate was mixed with 10 gms of carbon tetrachloride prior to addition. The catalyst and phenol were heated to 75° C. and slow addition of 647 gms (4.857 moles of 99.1% $C_{10}$ reactives) dicyclopentadiene concentrate begun. The total addition time was 2 hours and 43 minutes (9780 s) within a temperature range of 75° C.–85° C. When the hydrocarbon addition was complete, the temperature was gradually raised to 150° C. over a period of 4 hours (14400 s). The reaction was conducted for an additional 1 hour and 30 minutes (5400 s) before starting vacuum distillation. The reaction was finished at 250° C. and 1 mm of mercury. Total distillate was 875 gms for a yield of 1390.7 gms. See Table 1 for additional results of this synthesis.

EXAMPLE 8—(PHENOLIC RESIN PREP)

Using the same molar ratios of phenol and hydrocarbon as in Example 7, the $BF_3$ etherate catalyst was reduced from 0.4% by total weight to 0.1% by total reactant weight. Heat cycles were approximately the same. Table 1 describes the results of this synthesis.

EXAMPLE 9—(PHENOLIC RESIN PREP)

To a reactor equipped as in Example 3 were added 880.8 gms (8.0 moles) of resorcinol and 4.6 gms $BF_3$ etherate in 5 gms of carbon tetrachloride. The contents were heated to 110° C. and 264 gms (2.0 moles) of dicyclopentadiene concentrate were added over a 1 hour and 25 minute (5100 s) time period. The reactor temperature was controlled between 110° C. and 112° C. When dicyclopentadiene addition was complete, the reactor was gradually heated to 160° C. over a 4 hour (14400 s) time period. After an additional 1 hour (3600 s), the temperature was reduced and some water added. The water, which did not separate, and 350 gms of resorcinol were removed by vacuum distillation. The resultant product was predominantly a mixture of tetrafunctional and hexafunctional derivatives of resorcinol and $C_9$–$C_{11}$ dienes. Additional results of this synthesis are described in Table 1.

EXAMPLE 10—(PHENOLIC RESIN PREP)

To a reactor equipped as in Example 3 were added 2162 gms (20 moles) of ortho-cresol and 12.9 gms of $BF_3$ etherate in 20 grams of carbon tetrachloride. The mass was heated to 68° C. 1057 gms (8.0 moles) of a 99.9% reactive diene hydrocarbon stream containing about 85% dicyclopentadiene were added over the next 4 hours and 8 minutes (14880 s). The reaction temperature during this time was maintained at 68° C. to 85° C. The reactor was slowly heated to 150° C. over about 6 hours 21600 s). The product was then vacuum distilled and about 1111 gms of ortho-cresol recovered. The resultant product was primarily the result of 2 moles of ortho-cresol reacting with 1 mole of diene hydrocarbon. Additional results are described in Table 1.

EXAMPLE 11—(PHENOLIC RESIN PREP)

To a reactor equipped as in Example 3 were added 3387.6 gms (36 moles) of molten phenol and 17.9 gms of $BF_3$ etherate in 10 gms of carbon tetrachloride. The reactor was heated to 70° C. and 1081.1 gms (8.18 moles) of 99.9% reactive dicyclopentadiene concentrate employed in Example 10 was added over a 3 hour and 14 minute (11640 s) period. The temperature during this addition period was maintained between 70° C. and 85° C. After the hydrocarbon addition was complete, the mass was heated to 145° C. over a 4 hour (14400 s) time period. An additional reaction time of about 3 hours (10800 s) was given at that temperature and vacuum stripping of unreacted phenol commenced. The reaction was finished at 223° C. and 1 mm of mercury. Total distillate was 2160 gms providing a product yield of 2326.6 gms. See Table 1 for additional results of this synthesis.

EXAMPLE 12—(PHENOLIC RESIN PREP)

To a reactor equipped as in Example 3 were added 1854 gms (9 moles) of p-octyl phenol (diisobutyl phenol) and 11.6 gms $BF_3$ etherate in 20 gms of carbon tetrachloride. The temperature was set at 80° C. and 475.7 gms of 99.9% active DCPD concentrate were added over a 1 hour and 46 minute (6360 s) period. The reactor was heated from 90° C. to 165° C. over an 8 hour (28800 s) time period and vacuum distillation begun. About 85 gms of unreacted hydrocarbon and 915 grams of octyl phenol were removed. The resultant product contained mainly 2 and 3 phenolic hydroxyls per molecule. See Table 1 for further results of the synthesis.

EXAMPLE 13—(PHENOLIC RESIN PREP)

To a reactor equipped as in Example 3 were added 1035.1 gms (11 moles) of phenol and 9.5 gms of $BF_3$ etherate in 200 gms of toluene. The temperature was set at 40° C. A crude hydrocarbon stream containing mainly alkanes, alkenes and dienes in the $C_5$ to $C_{10}$ range, 355.5 gms (estimated at 3.33 moles of active product) was added over a 7 hour and 3 minute (25380 s) time period. A summary analysis of this stream is as follows:

| | |
|---|---|
| n-pentane | 5.8 wt. % |
| trans-pentane-2 | 1.6 wt. % |
| cis-pentane-2 | 1.5 wt. % |
| 2-methyl butene-2 | 4.1 wt. % |
| trans-piperyline | 16.3 wt. % |
| cis-piperyline | 10.8 wt. % |
| cyclopentene | 10.1 wt. % |
| dicyclopentadiene | 34.0 wt. % |
| cyclopentadiene/isoprene $C_{10}$ | 3.4 wt. % |
| remainder | 12.4 wt. % |

During the addition time, the temperature was in the 38° C. to 45° C. range. The reaction mass was heated to 145° C. over about 5 hours (18000 s). During this time 36 gms of unreacted hydrocarbon was removed. After about 2 hours (7200 s) of slight vacuum, an additional 431 gms of hydrocarbon toluene and phenol were removed. Full vacuum at 210° C. resulted in an additional distillate of 565 gms of phenol and $C_5$ alkylated phenol. The resultant product is further described in Table 1.

EXAMPLE 14—(PHENOLIC RESIN PREP)

To a reactor equipped as in Example 3 were added 1698.3 gms (18 moles) of phenol and 12.6 gms of $BF_3$ etherate in 10 gms of carbon tetrachloride. With the reactor temperature at 65° C., 408 gms (3 moles) of piperylene dimer were added to the reactor over 1 hour and 28 minutes (5280 s). The piperylene dimers used in this synthesis are believed to be a mixture of cyclic and linear products. The temperature range during the piperylene dimer addition was 65° C. to 85° C. The reaction mass was heated to 150° C. over about 5 hours and 15 minutes (18900 s). The reaction continued for 2 hours (7200 s) at that temperature, after which, vacuum distillation was started. The resin was finished at 220° C. and <2 mm of mercury. The total distillate was 1694 gms. The resultant product is further described in Table 1.

EXAMPLE 15—(PHENOLIC RESIN PREP)

To a reaction vessel equipped as in Example 3 were added 1882 gms (20 moles) of phenol, 300 grams of toluene and 10.5 gms of $BF_3$ etherate in 10 gms of carbon tetrachloride. At a temperature of 39° C., slow addition of a piperylene concentrate, with the following composition, was begun.

| | |
|---|---|
| trans-pentene-2 | 2.2 wt. % |
| cis-pentene-2 | 2.4 wt. % |
| 2-methyl butene-2 | 5.4 wt. % |
| trans-piperylene | 31.0 wt. % |
| cis-piperylene | 19.6 wt. % |
| cyclopentadiene | 1.4 wt. % |
| cyclopentene | 23.0 wt. % |
| dicyclopentadiene | 1.4 wt. % |
| remainder | 13.6 wt. % |

The total addition time was 3 hours and 35 minutes (12900 s) over a temperature range of 33° C. to 43° C. The reactants were then heated to 140° C. over a 3 hour (10800 s) time period during which time unreactive lights and some toluene were removed. An additional 3 hours (10800 s) reaction time at 145° C. was given and vacuum distillation started. The resin was finished at 235° C. and <2 mm of mercury. See Table 1 for results.

EXAMPLE 16—(PHENOLIC RESIN PREP)

To a reaction vessel equipped as in Example 3 was added 975.2 gms (8 moles) of 2,6 dimethyl phenol (98.5% purity with the remainder being mainly meta and para cresol). The xylenol was heated to 70° C. where 7.5 gms of $BF_3$ gas was heated over 47 minutes (2820 s). Slow addition of 528 gms of oligomer of dicyclopentadiene (Example 1), believed to have a molecular weight of about 190, was conducted over a 3 hour (10800 s) period within the temperature range of 70° C.–80° C. 200 gms of toluene was used to wash residual oligomer from the dropping funnel into the reactor. The reaction mass was heated to 160° C. over a 6-hour (21600 s) period during which time most of the toluene was removed from the reactor via atmospheric distillation. Vacuum stripping was started at 160° C. Distillation was finished at 220° C. and <1 mm of Hg. Analysis indicates formation of the bis xylenol of hydrocarbon oligomer with an average OH equivalent weight of 210. Thus the hydrocarbon molecular weight was 176. Xylenol recovery ratios confirm these values. See Table 1 for results.

EXAMPLE 17—(PHENOLIC PREP)

To a reactor equipped as in Example 3 were added 2258.4 gms (24 moles) of phenol and 264 gms (2 moles) of 99.9% reactive dicyclopentadiene concentrate (86.6% DCPD, 13.33% codimers and <0.1% lights). The reactor mass was heated to 48° C. and addition of 5.1 gms of $BF_3$ gas was started. The reactor temperature, which rapidly rose to 70° C., was controlled with external cooling. The catalyst was added over a 7 minute (420 s) time period. The temperature was then raised to 155° C. over a 4 and ½ hour (16200 s) time period. Vacuum stripping was completed at 212° C. and 1 mm of Hg. The resultant product is described in Table 1.

EXAMPLE 18—(PHENOLIC PREP)

To a reactor equipped as in Example 3 were added 912 gms (4 moles) of bisphenol A, 1882 gms (20 moles) of phenol and 15.4 gms of $BF_3$ etherate. The reaction mass was heated to 83° C., where the addition of 1057 gms (8 moles) of 99.9% reactive dicyclopentadiene concentrate was begun. Addition was complete in 2 hours and 25 minutes (8700 s). The temperature range during addition was 80° C.-85° C. The reaction was heated to 150° C. over about 6 hours (21600 s). Vacuum stripping was started at 150° C. and finished at 215° C. and 20 mm of Hg. See Table 1 for results.

EXAMPLE 19—(PHENOLIC PREP)

To a reactor equipped as in Example 3 were added 4140 gms (44 moles) of phenol and 18.6 gms of BF$_3$ etherate. The mass was heated to 58° C. at which point 528 gms (2 moles) of oligomer, prepared as in Example 2, and 400 gms of toluene were added. The temperature at the end of the hydrocarbon addition period (1 hour, 17 minutes or 4620 s) was 80° C. The reaction was slowly heated to 155° C. over 7 hours and 30 minutes (27000 s) at which point the excess phenol was removed. The resin was finished at 225° C. at less than 2 mm Hg. The resultant product is described in Table 1.

55 minutes (3300 s). The resin was transferred to a separating funnel where the brine and resin layer were allowed to separate. The brine layer was discarded and the resin solution returned to and heated to 75° C. 175 gms (0.875 moles) of 20% NaOH was added over a 27 minute (1620 s) period and then allowed to digest for an additional hour 3600 s) . The resin was transferred to a separating funnel, the brine layer drawn off, washed with water and the water layer removed. The resin solution was returned to the reactor where the epichlorohydrin and the methyl ether of propylene glycol were removed by vacuum distillation. The resin was finished at 150° C. and about 2 mm of Hg. The resin was a semi-solid at room temperature with an epoxy equivalent weight of 367.

EXAMPLES 21 THRU 34—(EPOXY PREP)

Table II illustrates the results of epoxy resins prepared from different phenolic resins. The manner of preparation was essentially the same as in Example 20.

TABLE I

| Resin | GPC Eq. Wt. | Melt Pt. °C. | Ave. Funct. | Lights | Functional Distribution, % | | | | | Ave. MW |
|---|---|---|---|---|---|---|---|---|---|---|
| | | | | | 1 | 2 | 3 | 4 | 5 | |
| Example 3 | 241 | 59° | 1.69 | 8.7 | 27.3 | 50.4 | 13.7 | — | — | 392 |
| Example 4 | 243 | 67° | 1.91 | — | 42.4 | 31.5 | 18.2 | 7.9 | — | 456 |
| Example 5 | 179 | 96° | 2.65 | 1.9 | 4.4 | 49.5 | 25.7 | 15.2 | 4.4 | 469 |
| Example 6 | 248 | 128° | 2.48 | — | 4.1 | 54.8 | 30.9 | 10.2 | — | 632 |
| Example 7 | 176 | 109° | 2.88 | — | 3.0 | 41.6 | 27.1 | 21.4 | 6.9 | 522 |
| Example 8 | 198 | SS | 1.90 | — | 50.4 | 15.4 | 27.7 | 6.5 | — | 365 |
| Example 9 | 84 | 118° | 4.56 | — | — | — | — | — | — | 424 |
| Example 10 | 187 | 62° | 2.08 | — | — | — | — | — | — | 389 |
| Example 11 | 173 | 105° | 2.75 | — | 0.8 | 49.9 | 28.0 | 16.5 | 4.8 | 490 |
| Example 12 | 287 | 88° | — | — | — | — | — | — | — | — |
| Example 13 | 258 | 79° | 2.54 | — | 3.8 | 56.5 | 24.3 | 13.0 | 2.4 | 394 |
| Example 14 | 175 | 61° | 1.98 | — | 18.4 | 65.3 | 16.4 | — | — | 344 |
| Example 15 | 132 | 65° | 2.36 | — | — | 64.2 | 35.8 | — | — | 314 |
| Example 16 | 210[a] | 105° | 2.00 | — | — | — | — | — | — | — |
| Example 17 | 167 | 90° | 2.27 | — | 3.8 | 71.6 | 17.6 | 7.0 | — | 388 |
| Example 18 | 190[a] | 76° | — | — | — | — | — | — | — | — |
| Example 19 | 211[a] | 119° | — | — | — | — | — | — | — | — |

[a]by OH analysis

EXAMPLE 20—(EPOXY PREP)

To a reactor equipped with a stirrer, condenser, nitrogen sparge, thermowell and addition funnel were added 878.5 gms (3.5 eq.) of the phenolic resin prepared in Example 4, 880 gms of the methyl ether of propylene glycol, 3.0 gms of 50% NaOH, 17 gms of water and 1618.7 gms (17.5 moles) of epichlorohydrin. The solution was heated to 75° C. 700 gms (3.5 moles) of 20% NaOH was added over a 1 hour and 12 minute (4320 s) period. The reaction was held at 75° C. for an additional

TABLE II

| Example | Phenolic Used | % NaOH 1st | % NaOH 2nd | Add'n Time Hrs:Min 1st | Add'n Time Hrs:Min 2nd | Epi/OH Ratio | Finish | MP °C. | EEW |
|---|---|---|---|---|---|---|---|---|---|
| 21 | Ex. 5 | 20 | 20 | 1:10 | 0.40 | 5:1 | 150° C. | 55 | 274 |
| 22 | Ex. 6 | 20 | 20 | 1:40 | 0:29 | 5:1 | 150° C. | 95 | 292 |
| 23 | Ex. 10 | 20 | 20 | 1:36 | 0:26 | 3:1 | 142° C. | Semi.Sol. | 335 |
| 24 | Ex. 9 | 20 | 20 | 2:05 | 0:22 | 4:1 | 235° C. | Semi.Sol. | 175 |
| 25 | Similar to Ex. 11 | 20 | 20 | 0:53 | 0:25 | 5:1 | 140° C. | 66 | 247 |
| 26 | Ex. 11 | 20 | 20 | 1:53 | 0:40 | 2.5:1 | 155° C. | 73 | 270 |
| 27 | Ex. 12 | 20 | 25 | 1:38 | 0:35 | 5:1 | 140° C. | 69 | 472 |
| 28 | Ex. 11 | 25 | 25 | 1:32 | 0:28 | 1.5:1 | 185° C. | 86 | 352 |
| NOTE: Compare 25, 26 and 28 for effect of epi ratio on same phenolic. | | | | | | | | | |
| 29 | Ex. 23 | 22 | 25 | 0:55 | 0:28 | 4:1 | 155° C. | Semi.Sol. | 222 |
| 30 | Ex. 14 | 22 | 25 | 1:00 | 0:37 | 4:1 | 160° C. | Semi.Sol. | 352 |
| 31 | Ex. 15 | 22 | 25 | 1:10 | 0:22 | 5:1 | 140° C. | Semi.Sol. | 256 |
| 32 | Ex. 18 | 22 | 25 | 1:40 | 0:27 | 5:1 | 160° C. | Semi.Sol. | 251 |
| 33 | Ex. 16 | 22 | 25 | 1:03 | 0:33 | 5:1 | 170° C. | 77 | 325 |
| 34 | Ex. 19 | 22 | 25 | 1:14 | 0:47 | 5:1 | 180° C. | 76 | 310 |

The resins prepared in Examples 20-34 were cured with 0.87 moles of Nadic methyl anhydride per epoxy equivalent and 1.5 weight % of dimethyl amine based upon the weight of the epoxy resin employing the following cure schedule.

| | |
|---|---|
| 2 hours (7200 s) at | 90° C. |
| 4 hours (14400 s) at | 165° C. |
| 16 hours (57600 s) at | 200° C. |

The physical properties are provided in Table III.

TABLE III

| Resin | Flexural Strength psi/MPa | Flexural Mod × $10^5$ psi/kPa | Tensile Strength psi/MPa | Elong. % | HDT °C. |
|---|---|---|---|---|---|
| Example 20 | 10,677/73.5 | 5.78/39.9 | 6,539/45.1 | 1.41 | — |
| Example 21 | 15,247/105.1 | 5.25/36.2 | 7,294/50.3 | 1.66 | 154 |
| Example 22 | 18,938/130.5 | 4.78/33 | 5,944/41 | 1.15 | 161 |
| Example 23 | 13,541/93.3 | 6.02/41.5 | 6,282/43.3 | 1.38 | 92 |
| Example 24 | 15,267/105.2 | 5.65/39 | 7,588/52.3 | 2.43 | 216 |
| Example 25 | 18,203/125.4 | 5.68/39.2 | 4,409/30.4 | 0.93 | 159 |
| Example 26 | 14,561/100.3 | 5.71/39.4 | 4,286/30 | 0.98 | 167 |
| Example 27 | 12,209/84.1 | 5.13/35.4 | 3,112/21.4 | 2.70 | 78 |
| Example 28 | 12,192/84 | 5.68/39.2 | 5,717/39.4 | 1.25 | 162 |
| Example 29 | 20,202/139.2 | 6.02/41.5 | 7,798/53.7 | 2.07 | 139 |
| Example 30 | 12,225/84.2 | 5.97/41.2 | 6,463/44.5 | 1.51 | 93 |
| Example 31 | 19,342/133.3 | 5.88/40.5 | 8,222/46.7 | 2.42 | 116 |
| Example 32 | 13,398/92.3 | 6.55/45.2 | 8,424/58 | 1.92 | 109 |
| Example 33 | 17,878/123.2 | 5.23/36.1 | 6,556/45.2 | 1.52 | 158 |
| Example 34 | 12,864/88.7 | 5.67/39.1 | 3,496/24.1 | 0.81 | 160 |

The shrinkage properties of Examples 21, 22 and 25 were compared to those of two conventional epoxy resins. Conventional Resin (CR) 1 was a phenolformaldehyde epoxy novolac resin having an average epoxide equivalent weight (EEW) of about 178 and an average epoxy functionality of about 3.8. Conventional Resin 2 was a diglycidyl ether of bisphenol A having an average EEW of about 190. The resins were cured with 0.87 moles of Nadic methyl anhydride per oxirane equivalents and 1.5 wt.% benzyl dimethyl amine based on the epoxy resin, using the following cure schedule:

| | |
|---|---|
| 2 hours (7200 s) at | 90° C. |
| 4 hours (14400 s) at | 165° C. |
| 16 hours (57600 s) at | 200° C. |

The linear shrinkage in a 10" by 1" (25.4 cm×2.54 cm) V shaped mold was determined by measuring the length of the specimen after cure. The results were as follows.

| Resin | % Shrinkage During Cure |
|---|---|
| CR 1 | 0.98 |
| CR 2 | 0.99 |
| Example 21 | 0.70 |
| Example 22 | 0.75 |
| Example 25 | 0.49 |

The temperature stability of the epoxy resins prepared in Examples 21 and 22 were compared to CR 1 employing the following procedure.

Clear unfilled castings, ⅛" (0.3175 cm) in thickness, were prepared using the same formulation and cure schedule described in the shrinkage evaluation. 1"×3" (2.54 cm×7.62 cm) specimens were exposed to 260° C. with the following results.

| | % Wt. Loss after | | |
|---|---|---|---|
| | 100 hrs[1] | 300 hrs[2] | 500 hrs[3] |
| CR 1 | 2.56 | 3.38 | 3.87 |
| Example 21 | 2.70 | 4.20 | 5.08 |
| Example 22 | 2.46 | 3.52 | 4.23 |
| | Flexural Strength, psi/MPa after | | |
| | 100 hrs[1] | 300 hrs[2] | 500 hrs[3] |
| CR 1 | 10,354/71.3 | 8,388/57.8 | 8,383/57.8 |
| Example 21 | 9,970/68.7 | 6,694/46.1 | 6,360/43.8 |
| Example 22 | 7,293/50.2 | 6,921/47.7 | 6,571/45.3 |

[1] $36 \times 10^4$ seconds
[2] $108 \times 10^4$ seconds
[3] $180 \times 10^4$ seconds The results show remarkably good temperature stability when compared to a well known high temperature stable epoxide.

The chemical resistance of the epoxy resins of Examples 21 and 22 were compared to that of CR 1 by exposing 1"×3" (2.54 cm×7.62 cm) specimens to various solvents at 23° C. The weight change was recorded after exposure at various times. The castings were prepared employing the same formulation and cure schedule as was employed in the shrinkage evaluation. The results are provided in Table IV.

| | % Weight Gain After the Indicated Days | | | |
|---|---|---|---|---|
| | 7 | 21 | 42 | 90 |
| Acetone | | | | |
| Cr 1 | 0.11 | 0.54 | 1.21 | 1.57 |
| Example 21 | 3.01 | 7.96 | 13.80 | 21.57 |
| Example 22 | 1.22 | 4.16 | 8.64 | 17.75 |
| Water | | | | |
| CR 1 | 0.32 | 0.56 | 0.74 | 0.90 |
| Example 21 | 0.20 | 0.31 | 0.36 | 0.38 |
| Example 22 | 0.17 | 0.30 | 0.34 | 0.40 |
| 3% $H_2SO_4$ | | | | |
| CR 1 | 0.30 | 0.52 | 0.69 | 0.84 |
| Example 21 | 0.18 | 0.28 | 0.33 | 0.34 |
| Example 22 | 0.16 | 0.26 | 0.32 | 0.38 |
| 10% NaOH | | | | |
| Cr 1 | 0.22 | 0.38 | 0.49 | 0.58 |
| Example 21 | 0.13 | 0.20 | 0.24 | 0.28 |
| Example 22 | 0.10 | 0.18 | 0.23 | 0.28 |
| 10% HCl | | | | |
| CR 1 | 0.16 | 0.30 | 0.41 | 0.53 |
| Example 21 | 0.12 | 0.20 | 0.23 | 0.25 |
| Example 22 | 0.08 | 0.16 | 0.22 | 0.27 |

I claim:
1. An epoxy resin composition resulting from the dehydrohalogenation of the reaction product of
   (A) an epoxy alkyl halide; with
   (B) an acid catalyzed product resulting from reacting
      (1) at least one aromatic hydroxyl-containing compound having from one to two aromatic rings and at least one ortho or para position with respect to a hydroxyl group available for ring alkylation; with

(2) at least one unsaturated hydrocarbon selected from
  (a) monounsaturated or diunsaturated hydrocarbons having from 4 to 6 carbon atoms or mixture thereof;
  (b) unsaturated hydrocarbons containing an average of from 6 to about 55 carbon atoms per molecule and containing not more than 94 weight percent dicyclopentadiene;
  (c) oligomers and/or cooligomers of hydrocarbon dienes, which dienes have from 4 to about 18 carbon atoms and which dienes contain at least 6% by weight of dienes other than dicyclopentadiene; and
  (d) mixtures thereof; and
wherein the components (B-1) and (B-2) are employed in quantities which provide a mole ratio of (B-1) to (B-2) of from about 1.5:1 to about 30:1, and components (A) and (B) are employed in quantities which provide an epoxy group to phenolic hydroxyl group ratio of from about 1.5:1 to about 20:1.

2. An epoxy resin composition of claim 1 wherein the mole ratio of component (B-1) to component (B-2) is from about 1.5:1 to about 20:1, and the epoxy group to phenolic hydroxyl group ratio provided by components (A) and (B) is from about 3:1 to about 5:1.

3. An epoxy resin composition of claim 2 wherein component (A) is an epihalohydrin.

4. An epoxy resin composition of claims 1, 2 or 3 wherein component (B-1) is phenol and component (B-2) is a composition comprising
  (1) from about 70% to about 94% by weight of dicyclopentadiene;
  (2) from about 6 to about 30 percent by weight of dimers other than dicyclopentadiene and codimers of $C_4$–$C_6$ hydrocarbons;
  (3) from about zero to about 7 percent by weight of oligomers of $C_4$–$C_6$ dienes; and
  (4) the balance, if any, to provide 100% by weight of $C_4$–$C_6$ alkanes, alkenes and dienes.

5. An epoxy resin composition of claims 1, 2 or 3 wherein component (B-2) contains at least one unsaturated hydrocarbon selected from a hydrocarbon stream containing at least 30% piperylene or 30% isoprene with the remainder being mainly $C_5$–$C_{12}$ mono- and diunsaturated hydrocarbons.

6. An epoxy resin composition of claims 1, 2 or 3 wherein component (B-2) contains at least one unsaturated hydrocarbon concentrate having the following concentration:
  (1) 20–70% dicyclopentadiene;
  (2) 0–10% dimers of $C_4$–$C_6$ dienes other than dicyclopentadiene;
  (3) 0–10% oligomers of $C_4$–$C_6$ dienes;
  (4) the balance to provide 100% by weight of $C_4$–$C_6$ alkanes, $C_4$–$C_6$ alkenes or $C_4$–$C_6$ dienes.

7. An epoxy resin of claims 1, 2 or 3 wherein component (B-2) contains an unsaturated hydrocarbon composition comprising
  (1) 90–100% dimer of piperylene;
  (2) 0–10% higher molecular weight oligomer of piperylene; and
  (3) 0–4% piperylene.

8. An epoxy resin composition of claims 1, 2, or 3 wherein component (B-2) contains an unsaturated hydrocarbon prepared by the oligomerization of dicyclopentadiene concentrate which oligomerization product contains an average of from about 12 to about 55 carbon atoms per molecule.

9. An epoxy resin composition of claims 1, 2 or 3 wherein component (B-2) contains an unsaturated hydrocarbon stream containing dicyclopentadiene and at least one of
  (1) piperylene;
  (2) isoprene;
  (3) other $C_4$–$C_{18}$ unsaturated hydrocarbons; or
  (4) oligomers containing an average of from about 12 to about 55 carbon atoms per molecule.

10. An epoxy resin composition of claims 1, 2 or 3 wherein component (B) is an acid catalyzed product resulting from reacting
  (1) at least one aromatic hydroxyl-containing compound having only one aromatic ring, at least two aromatic hydroxyl groups and at least one ortho or para position with respect to a hydroxyl group available for ring alkylation; with
  (2) at least one unsaturated hydrocarbon selected from
    (a) mono- and diunsaturated hydrocarbons containing 4 to 6 carbon atoms;
    (b) unsaturated hydrocarbons containing an average of 6–55 carbon atoms per molecule and containing not more than 94 weight percent dicyclopentadiene; and
    (c) oligomers or cooligomers of dienes, which dienes have from 4 to about 18 carbon atoms and which dienes contain at least 6% by weight of hydrocarbons other than dicyclopentadiene.

11. A composition having more than one phenolic hydroxyl group and more than one aromatic ring per molecule, which is substantially free of ether groups and which composition results from an acid catalyzed reaction of
  (A) at least one aromatic compound containing at least one aromatic hydroxyl-group and from one to two aromatic rings and at least one ortho or para position relative to a hydroxyl group available for ring alkylation; with
  (B) at least one unsaturated hydrocarbon selected from
    (1) monounsaturated or diunsaturated hydrocarbons having from 4 to 6 carbon atoms or mixtures thereof;
    (2) unsaturated hydrocarbons containing an average of from 6 to about 55 carbon atoms per molecule and containing not more than 94 weight percent dicyclopentadiene;
    (3) oligomers and/or cooligomers of hydrocarbon dienes, which dienes have from 4 to about 18 carbon atoms and which dienes contain at least 6% by weight of dienes other than dicyclopentadiene; and
    (4) mixtures thereof; and wherein
components (A) and (B) are employed in quantities which provide a mole ratio of component (A) to component (B) of from about 1.8:1 to about 30:1 and wherein said catalyst is employed in quantities of from about 0.01% to about 5% by weight of the quantity of component (A).

12. A composition of claim 11 wherein components (A) and (B) are employed in quantities which provide a mole ratio of (A) to (B) of from about 1.8:1 to about 20:1 and said catalyst employed in a quantity from about 0.3% to about 1% by weight of component (A).

13. A composition of claim 12 wherein component (A) is phenol and component (B) is a composition comprising
  (1) from about 20% to about 94% by weight of dicyclopentadiene;
  (2) from about 1 to about 30 percent by weight of dimers other than dicyclopentadiene and codimers of $C_4$–$C_6$ hydrocarbons;
  (3) from about zero to about 10 percent by weight of oligomers of $C_4$–$C_6$ dienes; and
  (4) the balance, if any, to provide 100% by weight of $C_4$–$C_6$ alkanes, alkenes and dienes.

14. A composition resulting from subjecting a mixture containing (a) an epoxy resin composition containing a composition of claims 1, 2 or 3 and (b) an effective quantity of one or more suitable curing agents to conditions suitable for curing said mixture.

15. A composition resulting from subjecting a mixture containing (a) an epoxy resin composition of claim 4 and (b) an effective quantity of one or more suitable curing agents to conditions suitable for curing said mixture.

16. A composition resulting from subjecting a mixture containing (a) an epoxy resin composition containing a composition of claim 5 and (b) an effective quantity of one or more suitable curing agents to conditions suitable for curing said mixture.

17. A composition resulting from subjecting a mixture containing (a) an epoxy resin composition containing a composition of claim 6 and (b) an effective quantity of one or more suitable curing agents to conditions suitable for curing said mixture.

18. A composition resulting from subjecting a mixture containing (a) an epoxy resin composition containing a composition of claim 7 and (b) an effective quantity of one or more suitable curing agents to conditions suitable for curing said mixture.

19. A composition resulting from subjecting a mixture containing (a) an epoxy resin composition containing a composition of claim 8 and (b) an effective quantity of one or more suitable curing agents to conditions suitable for curing said mixture.

20. A composition resulting from subjecting a mixture containing (a) an epoxy resin composition containing a composition of claim 9 and (b) an effective quantity of one or more suitable curing agents to conditions suitable for curing said mixture.

21. A composition resulting from subjecting a mixture containing (a) an epoxy resin composition containing a composition of claim 10 and (b) an effective quantity of one or more suitable curing agents to conditions suitable for curing said mixture.

* * * * *